UNITED STATES PATENT OFFICE.

GEORGE W. PIERCE, OF CAMBRIDGE, MASSACHUSETTS, ASSIGNOR TO MASSACHUSETTS WIRELESS EQUIPMENT COMPANY, OF BOSTON, MASSACHUSETTS, A CORPORATION OF NEW YORK.

RECTIFIER AND DETECTOR.

No. 879,062.   Specification of Letters Patent.   Patented Feb. 11, 1908.

Application filed April 5, 1907. Serial No. 366,566.

*To all whom it may concern:*

Be it known that I, GEORGE W. PIERCE, citizen of the United States, and resident of Cambridge, Massachusetts, Middlesex county, have invented certain new and useful Improvements in Rectifiers and Detectors, of which the following is a specification.

The invention relates to rectifiers and detectors for electric currents or electric oscillations and more particularly to rectifiers and detectors such as may be successfully used as receivers in wireless telegraphy or electric wave signaling systems.

In practicing the invention I employ as a rectifier or detector oxid of titanium in one of its conductive forms in connection with any suitable means for including such substance in a circuit.

I have discovered that the conductive forms of this substance are asymmetrically conductive when used in connection with small currents, and I have also discovered that by reason of this property of asymmetrical conductivity and possibly of other unknown properties this substance when properly placed between conductive electrodes is highly sensitive as a receiver for electromagnetic waves.

The oxid of titanium employed may be in the form of metallic titanium which has been oxidized in some suitable manner as by holding it in the oxidizing flame of a blast lamp. The oxid in this form is asymmetrically conductive and may be used to rectify small oscillatory currents and as a receiver for wireless telegraphy systems. I have also found that the natural crystals of oxid of titanium known as brookite and as octahedrite or anatase, are asymmetrically conductive and that a crystal of either of these substances or a piece suitably cut therefrom and properly placed between conductive electrodes is highly sensitive as a receiver for electromagnetic waves. I have also found that octahedrite, or anatase, is extremely sensitive when used as a receiver for such waves.

The rectifying or detecting material may be utilized in many and various shapes and may be connected in the circuit of the receiving or other apparatus in various ways.

Figure 1:
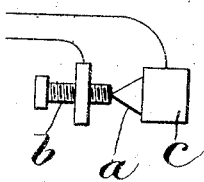
Figure 2:
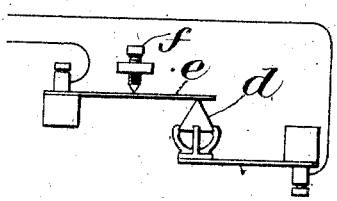
Figure 3:
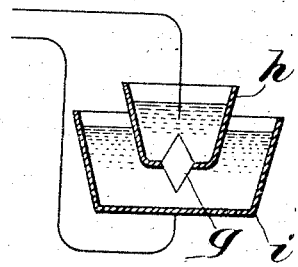
Figure 4:
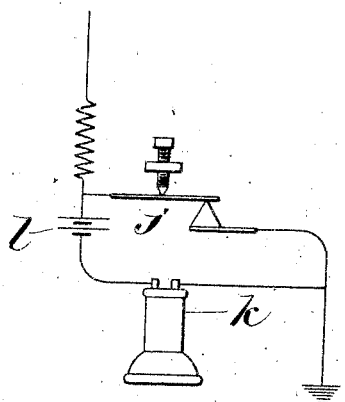
Figure 5:
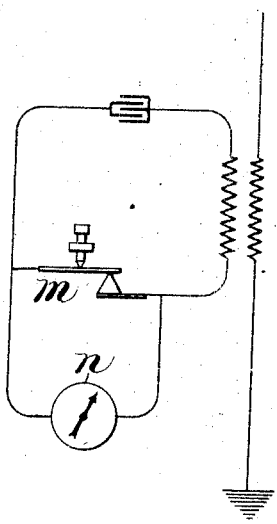

For the purpose of illustration I have shown several forms of rectifiers and detectors in the accompanying drawings in which Figures 1 to 3 show different ways in which the rectifying or detecting material may be connected with electrodes. Fig. 4 shows a detector arranged in a direct connnected receiving system, and Fig. 5 shows a detector arranged in an inductively coupled receiving system.

In the arrangement of Fig. 1 a piece $a$ of conductive oxid of titanium, herein shown as a piece of a crystal of octahedrite or anatase, is held in a clamp, the jaws $b$ and $c$ of which form electrodes making contact with the rectifying or detecting material.

I have secured the best results by cutting a piece from a crystal on a plane substantially at right angles to its axis and engaging one of the electrodes with a point or corner of the crystal so that a small area of contact is secured.

In the arrangement of Fig. 2 a crystal or fragment of a crystal $d$ is held in an ordinary jewel mounting and a point of the crystal is engaged by a metallic spring $e$. The contact between the spring $e$ and the detecting material may be adjusted by a screw $f$ to secure the character of contact which will give the best results.

In the arrangement shown in Fig. 3 a piece $g$ of the conductive oxid of titanium is sealed in the end of a glass tube $h$. The piece $g$ is in contact with a mass of conducting liquid within the tube $h$ and with a second mass of conducting liquid within a receptacle $i$, the masses of liquid forming the electrodes which contact with the piece $g$. The liquid should be such that it will not act upon the oxid of titanium and in case anatase is used mercury may be used as the liquid electrodes.

Any other suitable form and arrangement of the electrodes and of the rectifying or detecting material may be employed which may be found desirable or best suited to the conditions under which the particular apparatus in which the invention is embodied is to be used.

The constructions described or any other suitable construction may be utilized to rectify small oscillatory currents wherever such rectification is desirable as for instance in investigating telephonic currents. These or other suitable constructions may also be utilized as wave detectors or receivers in any suitable or well known receiving apparatus for wireless telegraphy systems, and any suitable form of indicating device may be employed therewith such for instance as a relay, a galvanometer, a telephonic receiver, a capillary electrometer, etc.

In Fig. 4 a receiver $j$ embodying the invention is shown included in a direct connected receiving system, in which a telephonic receiver $k$ is connected in shunt about the detector. A small battery $l$ may be included in the indicator circuit although I have secured as good if not better results without a battery when using either brookite or octahedrite in the receiver.

When used the battery current lowers the resistance of the rectifier since the resistance of the rectifying material decreases with the increase of current, and by reason of the fact that the current through the detector is not proportional to the voltage an additional rectification is obtained under some conditions.

In Fig. 4 a receiver $m$ embodying the invention is shown included in an inductively coupled receiving system In this case the indicating device is shown as a galvanometer $n$ connected in shunt about the receiver.

Other arrangements of circuits and other forms of indicating devices may be used with or without a battery in the indicator circuit according to the conditions under which the receiver is to be used.

What I claim is:—

1. A rectifier for oscillatory currents consisting of a conductive oxid of titanium.

2. A rectifier for oscillatory currents consisting of a conductive crystalline oxid of titanium.

3. A rectifier for oscillatory currents consisting of octahedrite or anatase.

4. A receiver for wireless telegraphy systems consisting of a conductive oxid of titanium in contact with two electrodes.

5. A rectifier for oscillating currents consisting of a conductive oxid of titanium in contact with two electrodes.

6. A receiver for wireless telegraphy systems consisting of octahedrite or anatase in contact with two electrodes.

7. A rectifier for oscillatory currents consisting of octahedrite or anatase in contact with two electrodes.

In witness whereof, I have hereunto set my hand, this 19th day of March 1907.

GEORGE W. PIERCE.

In presence of—
IRA L. FISH,
KATHARINE A. DUGAN.